United States Patent
Takeguchi et al.

(10) Patent No.: US 7,848,547 B2
(45) Date of Patent: Dec. 7, 2010

(54) APPARATUS FOR DETECTING FEATURE POINT AND METHOD OF DETECTING FEATURE POINT

(75) Inventors: Tomoyuki Takeguchi, Kanagawa (JP); Tatsuo Kozakaya, Kanagawa (JP); Masahide Nishiura, Tokyo (JP); Osamu Yamaguchi, Kanagawa (JP); Mayumi Yuasa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 950 days.

(21) Appl. No.: 11/712,366

(22) Filed: Mar. 1, 2007

(65) Prior Publication Data

US 2007/0211944 A1    Sep. 13, 2007

(30) Foreign Application Priority Data

Mar. 7, 2006    (JP) .............................. 2006-061917

(51) Int. Cl.
*G06K 9/46* (2006.01)
*G06T 17/00* (2006.01)

(52) U.S. Cl. ........................ 382/118; 382/154; 382/201; 382/132

(58) Field of Classification Search .................. 382/118, 382/190, 201, 131, 132, 154, 285
See application file for complete search history.

(56) References Cited

U.S. PATENT DOCUMENTS

| 5,805,745 | A | | 9/1998 | Graf | |
|---|---|---|---|---|---|
| 5,982,912 | A | | 11/1999 | Fukui et al. | |
| 5,995,639 | A | * | 11/1999 | Kado et al. | 382/118 |
| 6,072,893 | A | | 6/2000 | Luo et al. | |
| 6,580,821 | B1 | * | 6/2003 | Roy | 382/154 |
| 2005/0265604 | A1 | | 12/2005 | Yuasa | |
| 2006/0269143 | A1 | | 11/2006 | Kozakaya | |
| 2007/0080967 | A1 | * | 4/2007 | Miller | 345/473 |
| 2007/0183665 | A1 | * | 8/2007 | Yuasa et al. | 382/195 |
| 2007/0258645 | A1 | * | 11/2007 | Gokturk et al. | 382/190 |
| 2008/0137934 | A1 | * | 6/2008 | Sakaguchi et al. | 382/132 |

FOREIGN PATENT DOCUMENTS

JP    02-073471    3/1990

(Continued)

OTHER PUBLICATIONS

Yuasa et al., "Face Feature Point Detecting Device and Method", U.S. Appl. No. 11/524,270, filed Sep. 21, 2006.

(Continued)

*Primary Examiner*—Jon Chang
(74) *Attorney, Agent, or Firm*—Finnegan, Henderson, Farabow, Garrett & Dunner, L.L.P.

(57) ABSTRACT

An apparatus for detecting a feature point includes an image input unit that inputs an image of the target object; a three-dimensional shape information holding unit that stores three-dimensional shape information including reference feature points of a model relating to the target object; a correspondence relation acquiring unit that acquires a correspondence relation between the input image and the three-dimensional shape; a seek area acquiring unit that acquires image information of a seek area on the input image corresponding to an area including a point corresponding to the specific feature point in the model on the basis of the correspondence relation; and a feature point detecting unit that detects the position of the specific feature point in the input image from the image information.

9 Claims, 6 Drawing Sheets

FOREIGN PATENT DOCUMENTS

| | | |
|---|---|---|
| JP | 09-251534 | 9/1997 |
| JP | 10-86696 | 4/1998 |
| JP | 3279913 | 2/2002 |
| JP | 2003-141552 | 5/2003 |
| JP | 2003-187247 | 7/2003 |
| JP | 2004-265267 | 9/2004 |

OTHER PUBLICATIONS

Notification of Reasons for Refusal for Application No. 2006-061917, the Japanese Patent Office, mailed May 25, 2010.

* cited by examiner

APPARATUS FOR DETECTING FEATURE POINT AND METHOD OF DETECTING FEATURE POINT

CROSS-REFERENCE TO RELATED APPLICATIONS

This application is based upon and claims the benefit of priority from the prior Japanese Patent Application No. 2006-61917, filed on Mar. 7, 2006; the entire contents of which are incorporated herein by reference.

TECHNICAL FIELD

The present invention relates to an apparatus for detecting a feature point that detects a feature point of a target object from an input image, and a method of detecting the feature point.

BACKGROUND OF THE INVENTION

In an apparatus for detecting feature point in the related art, there is a method of detecting a small number of feature points such as a nose and eyes on a face image and then setting a new different feature point using the positions of the detected feature points as disclosed in Japanese Application Kokai 2004-265267.

There is also a method of limiting the range of searching the different feature point using the positions of the facial feature points detected on the image as disclosed in Japanese Application Kokai 10-86696.

In these methods, the detection of the second feature point is achieved by using a relative positional relationship with the detected first feature points on a stored two-dimensional image. However, there is a problem such that the second feature points cannot be detected correctly because the relative positional relationship of the feature points calculated when the face is oriented to the front does not indicate correct positions when the orientation of the face has changed.

As an example of the problem shown above, a method of detecting a point corresponding to a mouth center, which is a midpoint between the left end and the right end of the mouth, will be considered. As disclosed in Japanese Application Kokai 2003-187247, there is a method of detecting the lip area by sorting color components and defining the both ends of the lip area as lip ends, and the midpoint of the lip ends as the mouth center. When the face is oriented to the front, the mouth center is likely to be almost the same as a midpoint between the mouth ends. However, when the orientation of the face has changed, or when the shape of the portion around the mouth has changed because the facial expression has changed, the position of the mouth center dose not match the midpoint, and hence the position of the mouth center cannot be obtained correctly.

As described above, there is the method of detecting the first feature point and detecting the second feature point using the result of the first detection in the background of the detection of a feature point. However, since the relative positional relationship between the feature point obtained in the detection of the first feature point and the feature point obtained in the detection of the second feature point is defined on a two-dimensional image, when the orientation of the target object at the moment when the relative positional relationship is defined is different from the actual orientation of the target object, correct detection of the feature point cannot be achieved.

BRIEF SUMMARY OF THE INVENTION

In order to solve the problems in the related art as described above, it is an object of the invention to provide an apparatus for detecting a feature point and a method of detecting a feature point in which the feature point can be detected correctly even when the orientation of a target object is changed.

According to embodiments of the present invention, this embodiment is an apparatus for detecting a feature point that detects a specific feature point from an image including a target object including: An apparatus for detecting a specific feature point from an image including a target object comprising: an image input unit that inputs an image of the target object; a three-dimensional shape information storing unit that stores three-dimensional shape information of a model and three-dimensional position information of reference points in the model, the reference points each differing from the specific feature point; a correspondent reference point input unit that inputs position information of correspondent reference points of the reference feature points on the input image; a correspondent feature point acquiring unit that acquires position information of correspondent feature point of the specific feature point in the model; a correspondence relation acquiring unit that acquires a correspondence relation between the input image and the three-dimensional shape information using the position information of the correspondent reference points and the three-dimensional position information of the reference points; a seek area setting unit that sets a seek area for the specific feature point on the input image by projecting a correspondent area containing the correspondent feature point on surface of the model to the input image based on the correspondence relation; an image information acquiring unit that acquires image information of the seek area from the input image; and a feature point detecting unit that detects the position of the specific feature point in the input image from the image information.

According to the embodiments of the present invention, the feature point can be detected corresponding to the three-dimensional change of the orientation of the target object or the change in shape of the target object.

DETAILED DESCRIPTION OF THE INVENTION

An apparatus for detecting a feature point according to an embodiment of the present invention will be described.

First Embodiment

Referring to FIG. 1 to FIG. 6, an apparatus for detecting a feature point according to a first embodiment will be described. In this embodiment, a case of employing a face as a target object and detecting a midpoint of a mouth from a face image will be described.

(1) Configuration of an Apparatus for Detecting a Feature Point

Figure 1:
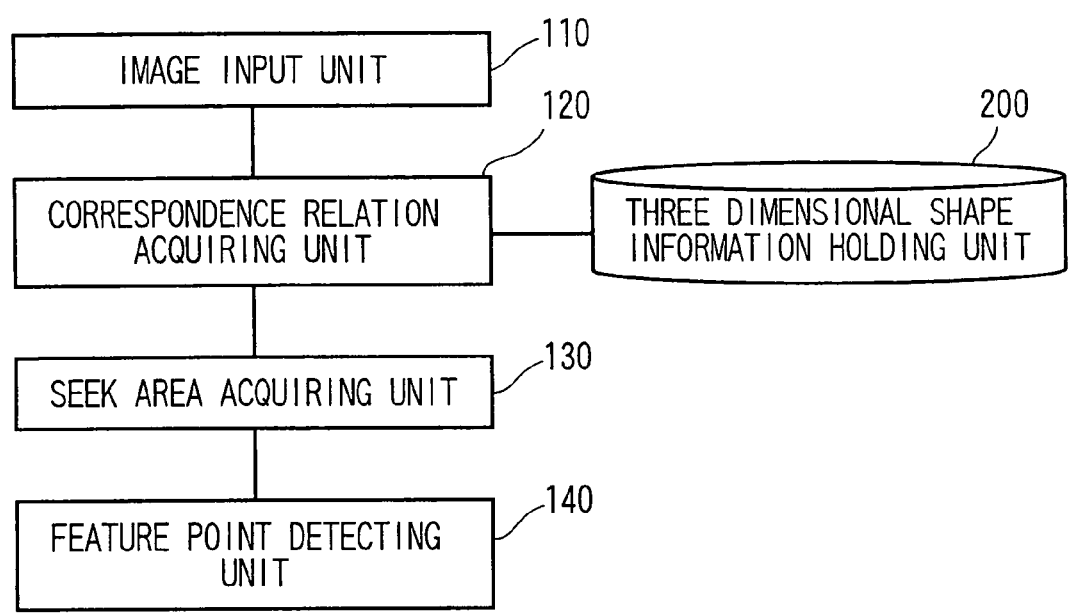
FIG. 1 is a block diagram showing a configuration of an apparatus for detecting a feature point according to a first embodiment of the present invention.

FIG. 1 is a block diagram showing an apparatus for detecting a feature point according to the first embodiment.

The apparatus for detecting a feature point includes an image input unit 110 that acquires a face image to be processed, a three-dimensional shape information holding unit 200 that holds an average three-dimensional shape of the face, a correspondence relation acquiring unit 120 that estimates the correspondence relation between the face image and a three-dimensional shape, a seek area acquiring unit 130 that sets a seek area for the mouth center on the input image using the acquired correspondence relation, and a feature point detecting unit 140 that determines the position of the mouth center from the seek area.

Functions of these units 110 to 140 and 200 are implemented by a program stored in a computer.

(2) Operation of the Apparatus for Detecting a Feature Point

Figure 2:
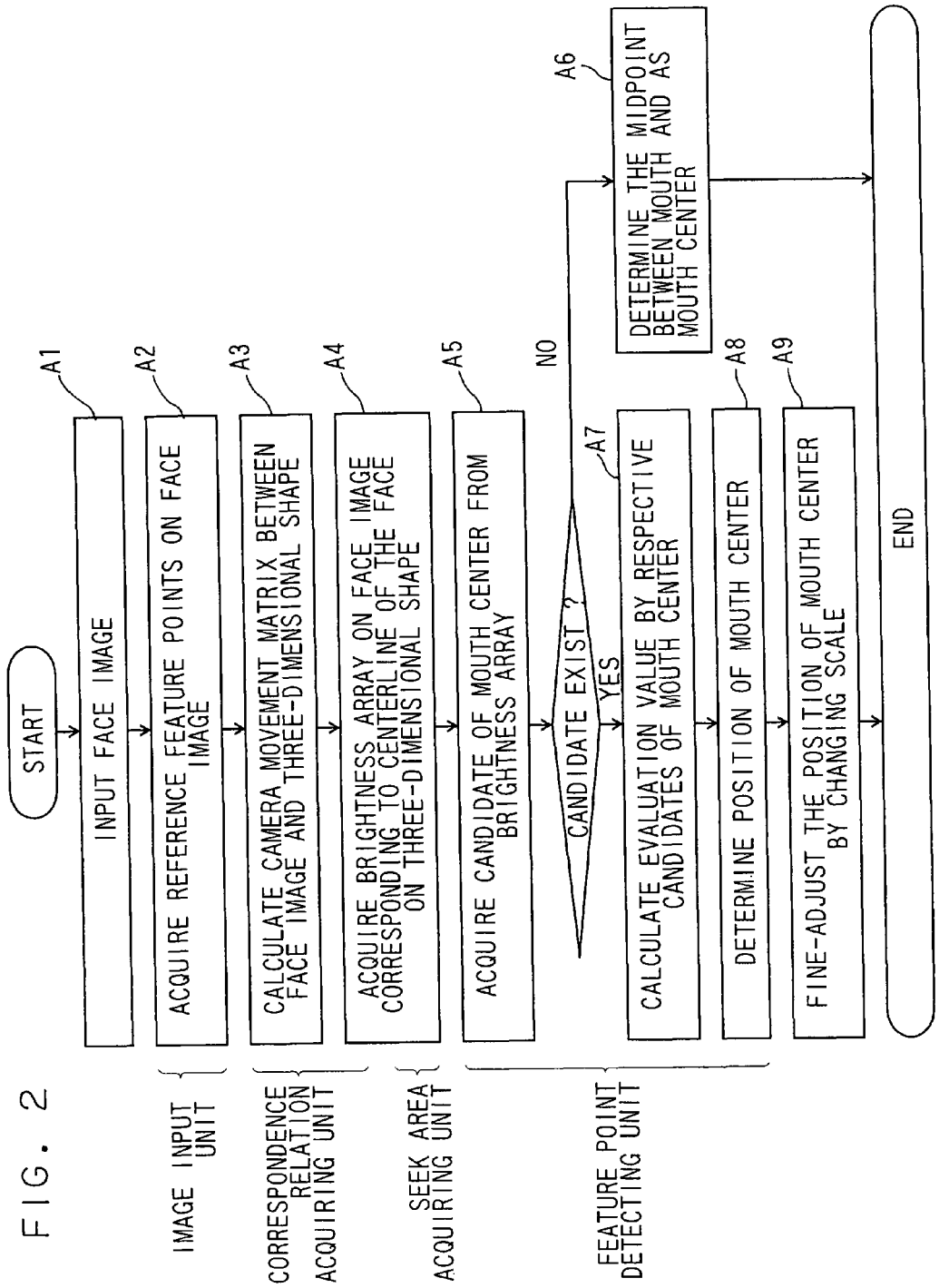
FIG. 2 is a flowchart showing an operation of the apparatus for detecting a feature point according to a first embodiment.

Referring now to FIG. 1 and FIG. 2, the operation of the apparatus for detecting a feature point will be described. FIG. 2 is a flowchart showing an operation of the apparatus for detecting a feature point.

(2-1) Step A1

In the image input unit 110, a digital image including a face area of a person as a target of feature detection is acquired by a digital camera, a scanner, or the like.

(2-2) Step A2

In the correspondence relation acquiring unit 120, a feature points other than the mouth center, which are referred to as reference feature points, are acquired from the facial image acquired by the image input unit 110. The reference feature points may include pupils, nasal spouts, mouth ends, for example. However, the position and the number of the reference feature points are not limited as long as there are at least four points in different planes. As a method of acquiring the reference feature points, they may be acquired by a manual input in which the positions are specified manually by a mouse, or by an automatic detecting method as disclosed in Japanese Patent No. 3279913 being incorporated herein by reference.

(2-3) Step A3

Figure 3:
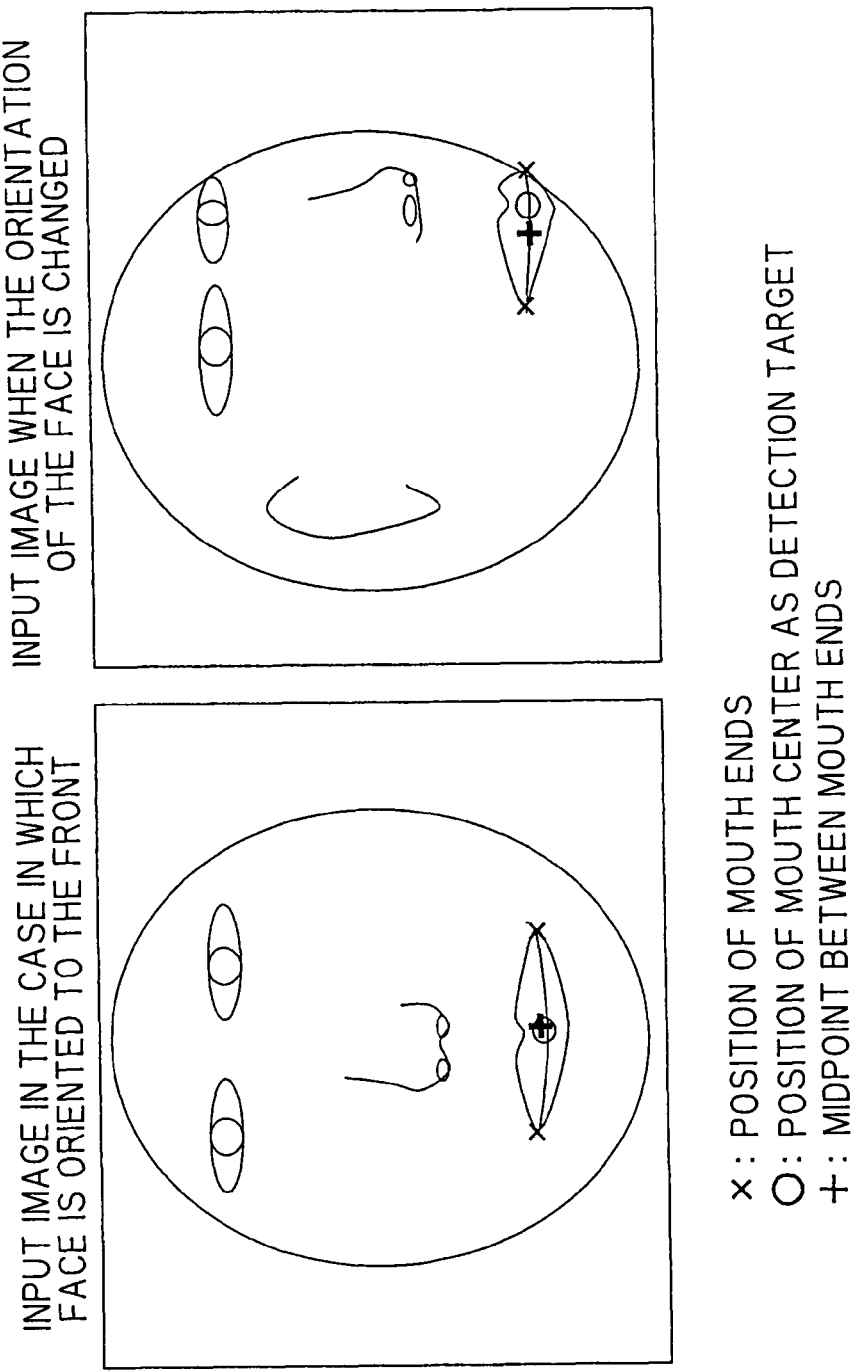
FIG. 3 is a drawing showing a problem in detection of the feature point in the related art.

When the right and left mouth end points are acquired as the reference feature points here, the mouth center can be detected as a midpoint of the both left and right mouth endpoints by a method disclosed in the above-described Japanese Application Kokai No. 2003-187247, the entire contents of which are incorporated herein by reference. As shown in FIG. 3, when the face is oriented to the front, the coordinate of the mouth center almost match the coordinate of the midpoint between the mouth ends. However, when the orientation of the face is changed, the coordinate of the mouth center does not match the coordinate of the midpoint between the mouth ends. When the facial expression is changed such as smile, the shape of the mouth is changed into an arcuate shape, so that it can easily be imagined that the coordinate of the mouth center is different from the coordinate of the midpoint between the mouth ends.

Therefore, in this embodiment, a relation between the face image and the three-dimensional shape is calculated using the coordinates of the reference feature points on the acquired face image and the positions of the reference feature points on the face shape stored in the three-dimensional shape information holding unit 200.

Figure 4:
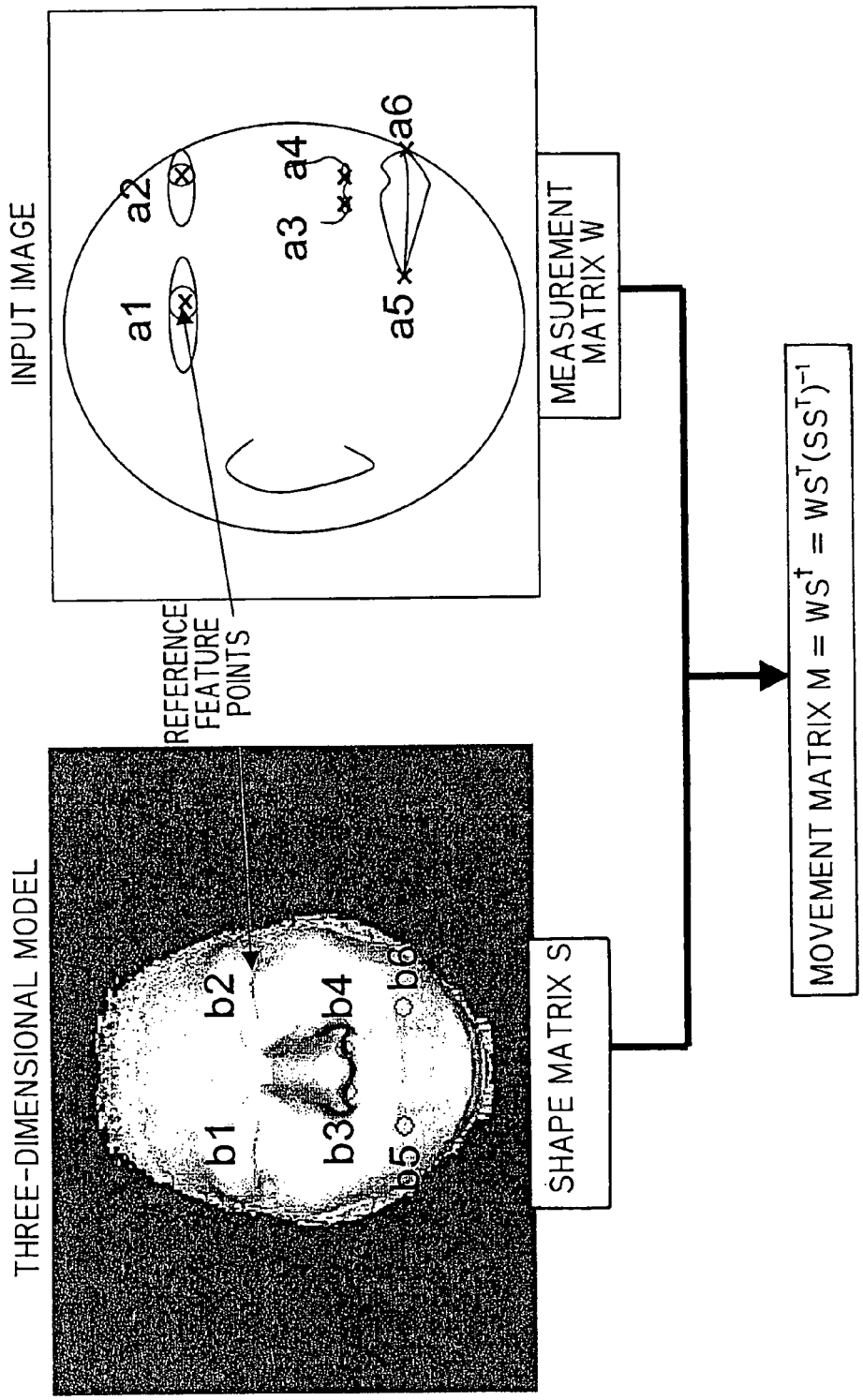
FIG. 4 is a drawing showing a process performed in a correspondence relation acquiring unit according to a first embodiment.

Firstly, as shown in the upper left in FIG. 4, three-dimensional shape information on a face and positions of the reference feature points on the three-dimensional shape are prepared in the three-dimensional shape information holding unit 200. The three-dimensional shape information of the face may be obtained by measuring the three-dimensional shape of a person in the input image, or may be a representative three-dimensional shape of the face obtained, for example, by averaging several three-dimensional shapes or by preparing with modeling software.

Subsequently, with a method disclosed in Japanese Application Kokai 2003-141552 using factorization, the entire contents of which are incorporated herein by reference, a movement matrix M which represents the correspondence relation is calculated from a shape matrix S in which the positions of the reference feature points on the three-dimensional shape information are arranged and a measurement matrix W in which the positions of the reference feature points on the input image are arranged.

For example, when six feature points are obtained from the input image of the face as shown in FIG. 4, when the coordinates of the six points are represented by vectors a1, a2, ... a6, the measurement matrix W is W=[a1, a2, ... a6], that is, a matrix of 2×6. When the coordinates of the positions of the feature points on the corresponding three-dimensional model are represented by vectors b1, b2, ... b6, the shape matrix S is S=[b1, b2, ... b6], that is, a matrix of 3×6. Therefore, the movement matrix M representing the correspondence relation between the three-dimensional model and the input face image is a matrix of 2×3 which can be calculated from an expression (1).

$$M=WS^T(SS^T)^{-1} \quad (1)$$

(2-4) Step A4

When the obtained movement matrix M is used, the position "a" of the point on the two-dimensional image (two-dimensional vector) corresponding to an arbitrary point "b" on the three-dimensional shape (three-dimensional vector) can be calculated from an expression (2).

$$a=Mb \quad (2)$$

Here, it is also possible to fix the position of the mouth center on the input image uniquely by projecting the coordinate of the mouth center on the three-dimensional shape onto the input image. However, when a representative three dimensional shape of the face is used as the three-dimensional shape, there is no guarantee that it is projected accurately on the mouth center due to the difference between the face of the person in the input image and the three-dimensional shape of the face. In addition, since the face is a non-rigid object, if the facial expression is changed, even when the three-dimensional shape of the person in question is used, there is no more guarantee that the position of the mouth center on the three-dimensional shape is projected accurately on the mouth center in the input image.

Figure 5:
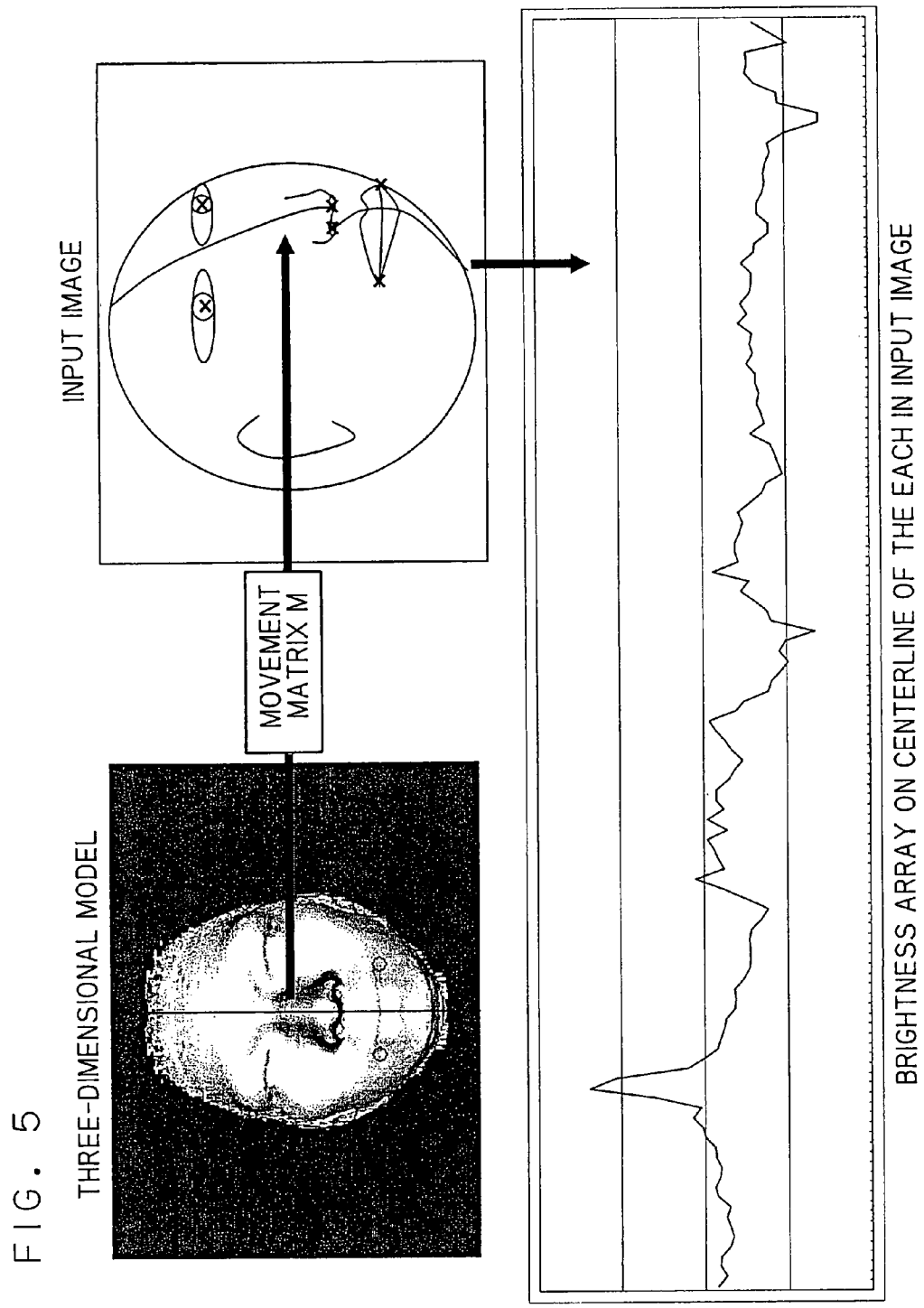
FIG. 5 is a drawing showing a process performed in a seek area acquiring unit according to a first embodiment.

Therefore, in the seek area acquiring unit 130, as shown in FIG. 5, a position obtained by projecting the center line of the face onto the three-dimensional shape using the movement matrix M acquired by the correspondence relation acquiring unit 120 is determined as the seek area. Even when the three-dimensional shape is different from the actual shape of the person in the input image, the position of the mouth center is expected to be anywhere on the center line of the face. Even when the facial expression is changed, it seems that the mouth center exists on the centerline of the face.

(2-5) Step A5

Lastly, in the feature point detecting unit 140, as shown in FIG. 5, brightness of pixels existing on the center line of the face (that is, an axis of lateral symmetry of the face) in the input face image are expressed into a one-dimensional waveform, and from this waveform, the position of the mouth center is detected.

Figure 6:
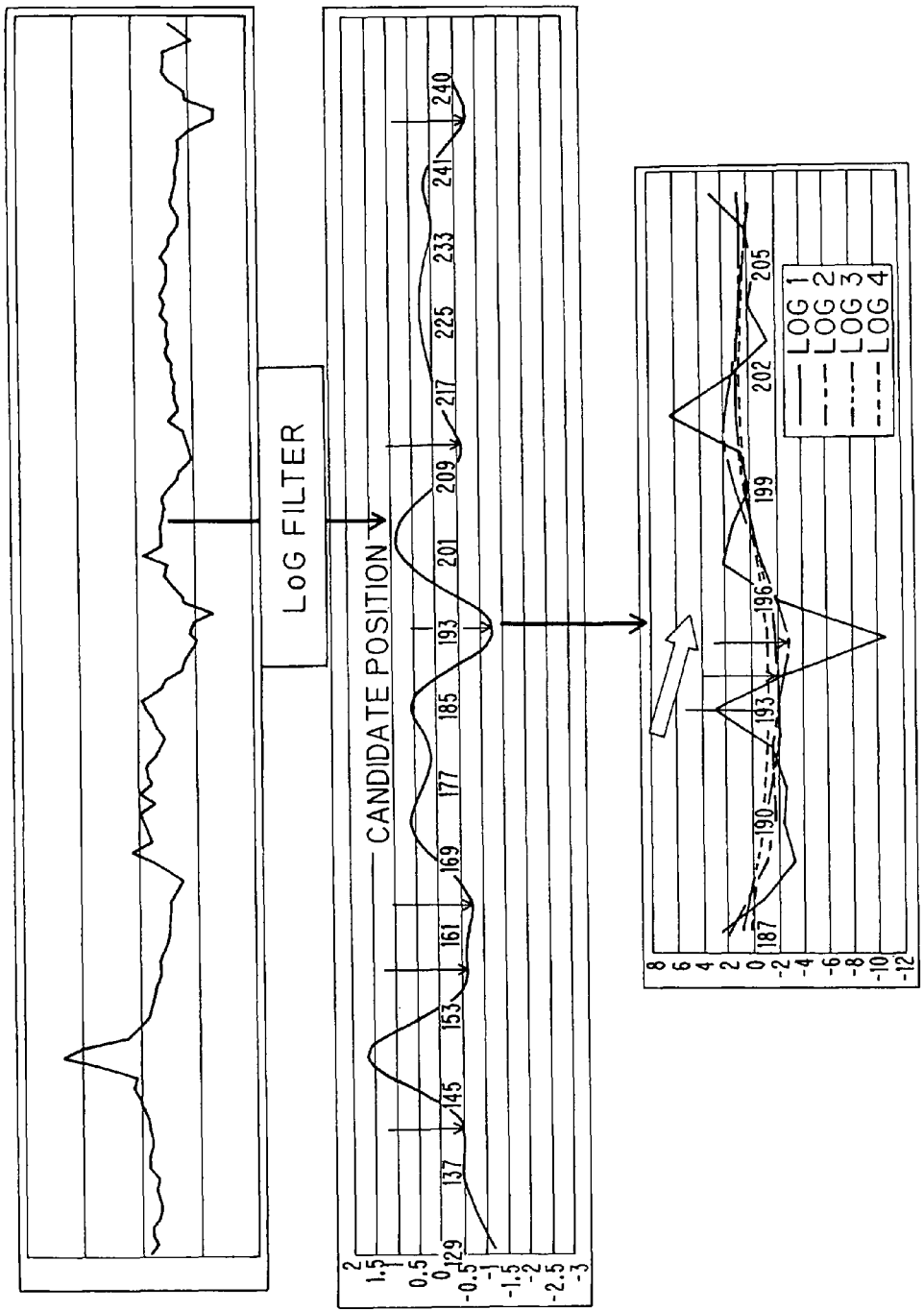
FIG. 6 is a drawing showing a process performed in a feature point detecting unit according to a first embodiment.

As the method of detecting the mouth center from the acquired one-dimensional waveform, for example, there is a method shown in FIG. 6. Firstly, brightness array is filtered by a Laplacian of Gaussian filter (LoG filter). The mouth center falls within the mouth area, and it can be imagined that the brightness of the mouth area is lower than the skin color around the mouth. Therefore, a position having the value which is equal to or smaller than zero and represents the minimum value is acquired from the waveform after having filtered by the Laplacian filter and the Gaussian filter as a candidate of the position of the mouth center.

(2-6) Step A6

When no candidate of the mouth center is obtained in the mouth center candidate acquisition, the procedure may be terminated by defining as undetectable, or may be terminated after having outputted the midpoint between the mouth ends as the position of the mouth center if the mouth ends are included in the reference feature points.

(2-7) Step A7

When there is a plurality of candidates of mouth center in the mouth center candidate acquisition, an evaluation value which represents a possibility of the mouth center is calculated at each mouth center candidate. For example, in this case, an inverse number of the value at the candidate position on the waveform after having filtered by the Laplacian of Gaussian filter is employed as the evaluation value.

(2-8) Step A8

The point whose evaluation value is the highest out of the evaluation values at the respective mouth center candidates is determined as an initial position of the mouth center.

(2-9) Step A9

Since the initial position of the detected mouth center is obtained from the waveform after having filtered by the Laplacian of Gaussian filter, there is an error between the original waveform and the minimum value. A scale parameter of the Gaussian filter is reduced stepwise, the initial position of the mouth center is shifted to a position of the closest local minimum value in each step, and the final position of the mouth center is determined.

(3) Effect

In this manner, with the apparatus for detecting a feature point according to the first embodiment, the mouth center can be detected corresponding to the change of the orientation of the face or the change of the facial expression by estimating the correspondence relation between the input image and the three-dimensional shape information and detecting the feature points after defining the position on the centerline of the face as the search range.

(4) Modification

The feature point to be detected in this embodiment is not limited to the mouth center.

For example, points of the upper and lower lip contours on the centerline of the face can be obtained. Detection of the points on the upper and lower lip contour on the centerline of the face can be realized by finding intersections with zero on the waveform of the brightness array on the center line of the face and filtering the same by the Laplacian of Gaussian filter, and detecting closest two intersections with zero with the intermediary of the mouth center therebetween.

A nose root, which is a nose root point, can be detected. Detection of the nose root point is realized by detecting the positions of both pupils in advance, obtaining the brightness array on the centerline of the face and filtering the same by the Laplacian of Gaussian filter to find the minimum value in the brightness array on the centerline of the face as the nose root candidate points, and extracting the candidate point which is the closest to the center of gravity of the positions of the both pupils.

Second Embodiment

The apparatus for detecting a feature point according to a second embodiment will be described. In this embodiment, a heart is employed as a target object, and will be described on the basis of an X-ray image as the two-dimensional image measured the heart by an X-ray cardiography.

The x-ray image of the heart is a projected image obtained, for example, by imaging blood vessels using iodine preparation which is a positive contrast agent in the target blood vessels. In the case of the coronary angiography, arterial surrounding the heart is observed using the contrast agent. In this case, the branch points of the thick main blood vessels can be detected easily as the reference feature points. On the other hand, positions of branch points of the thin blood vessels, or branch points which cannot be imaged due to thrombus cannot be estimated easily from the observed X-ray image. Therefore, this embodiment is intended to detect the feature points of the branch points of the blood vessels.

(1) Configuration of the Apparatus for Detecting a Feature Point

The apparatus for detecting a feature point in this embodiment is the same as that in the first embodiment, and includes the image input unit 110 that acquires an X-ray image to be processed, the three-dimensional shape information holding unit 200 that holds the average three-dimensional shape model of a heart and coronary artery, a correspondence relation acquiring unit 120 that estimates the correspondence relation between the X-ray image and the three-dimensional shape of the heart, a seek area acquiring unit 130 that sets a seek area for the branch points of the blood vessels on the input image using the acquired correspondence relation, and a feature point detecting unit 140 that determines the positions of the branch points of the blood vessels from the seek area.

The functions of these units 110 to 140 and 200 are implemented by a program stored in the computer.

(2) Operation of the Apparatus for Detecting a Feature Point

Subsequently, the operation of the apparatus for detecting a feature point will be described.

Firstly, the image input unit 110 input an X-ray image.

Then, the correspondence relation acquiring unit 120 detects at least four branch points of thick blood vessels which can be detected easily as reference feature points from the X-ray image obtained by the image input unit 110, and estimates the correspondence relation between the heart and the coronary artery with respect to the three-dimensional shape model. The method described in the first embodiment may be employed as the method of estimation.

Then, as regards the feature points which are difficult to detect from the X-ray image, the seek area acquiring unit 130 projects the positions of the feature points on the model which are difficult to detect and the three-dimensional plane area on the periphery thereof on the two-dimensional plane area of the X-ray image.

Subsequently, the projected plane area of the X-ray image corresponds to the seek area for the feature points, and the correction of brightness to the optimal value or the like is performed in the seek area. This is for facilitating the detection from the next step on.

Finally, in the feature point detecting unit 140, the positions which seem to be the branches of the blood vessels in the seek area by the corner detection method are specified by the edge detection.

In this manner, with the apparatus for detecting a feature point according to the second embodiment, by estimating the correspondence relation between the X-ray image and the three-dimensional shape information and determining the planner small area on the X-ray image obtained by projecting the planer small area including the feature points on the three-dimensional shape as the seek area, the feature points which have a small range of change in brightness and hence is difficult to specify the position can be detected.

Modifications

The present invention is not limited to the above-described embodiments, and components may be modified and embodied without departing the scope of the invention in the stage of implementation.

In addition, the embodiments may be modified into various forms by combining the plurality of components disclosed in the above-described embodiment as needed. For example, some of the components may be eliminated from the entire components shown in the embodiments. In addition, the components in the embodiments may be combined as needed.

What is claimed is:

1. An apparatus for detecting a specific feature point from an image including a target object comprising:
   an image input unit that inputs an image of the target object;
   a three-dimensional shape information storing unit that stores three-dimensional shape information of a model and three-dimensional position information of reference points in the model, the reference points each differing from the specific feature point;
   a correspondent reference point input unit that inputs position information of correspondent reference points of reference feature points on the input image;
   a correspondent feature point acquiring unit that acquires position information of correspondent feature points of the specific feature point in the model;
   a correspondence relation acquiring unit that acquires a correspondence relation between the input image and the three-dimensional shape information using the position information of the correspondent reference points and the three-dimensional position information of the reference points;
   a seek area setting unit that sets a seek area for the specific feature point on the input image by projecting a correspondent area containing the correspondent feature point on surface of the model to the input image based on the correspondence relation;
   an image information acquiring unit that acquires image information of the seek area from the input image; and
   a feature point detecting unit that detects the position of the specific feature point in the input image from the image information;
   wherein the correspondent area is a curved or a linear area on the surface of the model, and the image information is one-dimensionally arranged pixel information on the input image.

2. The apparatus of claim 1, wherein the model is a model of a human face, and the correspondent area is an area which passes through the specific feature point on the surface of the model.

3. The apparatus of claim 2, wherein the correspondent feature point is a mouth center which corresponds to the midpoint between the left end and the right end of the lip of the model, and the correspondent area is the centerline of the human face which passes through the mouth center on the surface of the model.

4. A method of detecting a specific feature point from an image including a target object, comprising:
   inputting an image of the target object;
   storing three-dimensional shape information of a model and three-dimensional position information of reference points in the model, the reference points each differing from the specific feature point;
   inputting position information of correspondent reference points of reference feature points on the input image;
   acquiring position information of correspondent feature points of the specific feature point in the model;
   acquiring a correspondence relation between the input image and the three-dimensional shape information using the position information of the correspondent reference points and the three-dimensional position information of the reference points;
   setting a seek area for the specific feature point on the input image by projecting a correspondent area containing the correspondent feature point on surface of the model to the input image based on the correspondence relation;
   acquiring image information of the seek area from the input image; and
   detecting the position of the specific feature point in the input image from the image information;
   wherein the correspondent area is a curved or a linear area on the surface of the model, and the image information is one-dimensionally arranged pixel information on the input image.

5. The method of claim 4, wherein the model is a model of a human face, and the correspondent area is an area which passes through the specific feature point on the surface of the model.

6. The method of claim 5, wherein the correspondent feature point is a mouth center which corresponds to the midpoint between the left end and the right end of the lip of the model, and the correspondent area is the centerline of the human face which passes through the mouth center on the surface of the model.

7. A non-transitory computer-readable recording medium including a program for detecting a specific feature point from a target object stored therein, the program comprising instructions for causing a computer to execute:
   inputting an image of the target object;
   storing three-dimensional shape information of a model and three-dimensional position information of reference points in the model, the reference points each differing from the specific feature point;
   inputting position information of correspondent reference points of reference feature points on the input image;
   acquiring position information of correspondent feature points of the specific feature point in the model;

acquiring a correspondence relation between the input image and the three-dimensional shape information using the position information of the correspondent reference points and the three-dimensional position information of the reference points;

setting a seek area for the specific feature point on the input image by projecting a correspondent area containing the correspondent feature point on surface of the model to the input image based on the correspondence relation;

acquiring image information of the seek area from the input image; and detecting the position of the specific feature point in the input image from the image information;

wherein the correspondent area is a curved or a linear area on the surface of the model, and the image information is one-dimensionally arranged pixel information on the input image.

8. The computer-readable recording medium of claim 7, wherein the model is a model of a human face, and the correspondent area is an area which passes through the specific feature point on the surface of the model.

9. The computer-readable recording medium of claim 8, wherein the correspondent feature point is a mouth center which corresponds to the midpoint between the left end and the right end of the lip of the model, and the correspondent area is the centerline of the human face which passes through the mouth center on the surface of the model.

* * * * *